United States Patent
Choi et al.

(10) Patent No.: US 8,658,891 B2
(45) Date of Patent: Feb. 25, 2014

(54) STOP JOINT FOR A SUPERCONDUCTING CABLE

(75) Inventors: Chang Youl Choi, Gumi-si (KR); Su Kil Lee, Gumi-si (KR); Hyun Man Jang, Hwaseong-si (KR); Seok Hern Jang, Gunpo-si (KR)

(73) Assignee: LS Cable Ltd., Anyang-Si, Gyeonggi-Do (KR)

( * ) Notice: Subject to any disclaimer, the term of this patent is extended or adjusted under 35 U.S.C. 154(b) by 367 days.

(21) Appl. No.: 13/235,883

(22) Filed: Sep. 19, 2011

(65) Prior Publication Data
US 2012/0186854 A1    Jul. 26, 2012

(30) Foreign Application Priority Data
Jan. 26, 2011 (KR) .................. 10-2011-0007643

(51) Int. Cl.
*H02G 15/24*    (2006.01)

(52) U.S. Cl.
USPC .................. 174/19; 174/21 R; 174/23 R

(58) Field of Classification Search
USPC ............ 174/19, 20, 21 R, 24, 28, 29, 36
See application file for complete search history.

(56) References Cited

U.S. PATENT DOCUMENTS

| | | | | |
|---|---|---|---|---|
| 3,483,886 A * | 12/1969 | Napolitano | .................. | 137/493 |
| 5,280,131 A * | 1/1994 | Sarro | .................. | 174/15.6 |
| 5,865,212 A * | 2/1999 | Gaines | .................. | 137/599.11 |
| 6,021,797 A * | 2/2000 | Gaines | .................. | 137/2 |
| 6,501,970 B2 * | 12/2002 | Heise et al. | .................. | 505/163 |

* cited by examiner

*Primary Examiner* — William H Mayo, III
(74) *Attorney, Agent, or Firm* — Lowe Hauptman & Ham, LLP

(57) ABSTRACT

A stop joint for a superconducting cable is provided to maintain superconducting properties by installing the stop joint on a long distance line in which a long distance superconducting cable has to be installed and unitizing a circulation path of a cooling fluid.

6 Claims, 2 Drawing Sheets

STOP JOINT FOR A SUPERCONDUCTING CABLE

CROSS-REFERENCE TO RELATED APPLICATION

This application claims priority to Korean Patent Application No. 2011-7643, filed on Jan. 26, 2011, and all the benefits accruing therefrom under 35 U.S.C. §119, the contents of which in its entirety are herein incorporated by reference.

BACKGROUND

1. Field

This disclosure relates to a stop joint for a superconducting cable, and more particularly, to a stop joint installed on a long distance line (for example, 2 km or longer) in which a long distance superconducting cable has to be installed in order to reduce a circulation distance of a cooling fluid, thereby maintaining superconducting properties.

2. Description of the Related Art

As shown in FIG. 1, a superconducting cable system includes two terminal structures 12 and 14 to which a superconducting cable 10 is connected, and a refrigerator 16 and a circulation pump 18 provided on the front side of the one terminal structure 12.

In addition, in order to extend the length of the superconducting cable 10, a plurality of intermediate pull boxes 20 is connected on the line.

In the existing superconducting cable system, a cooling flow path is formed inside the superconducting cable 10 to cause a cooling fluid (for example, liquid nitrogen) to flow. The cooling fluid is supplied to the one terminal structure 12 through a supply pipe 22, and discharged through the other terminal structure 14, and is supplied to the refrigerator 16 through a recovery pipe 24 again so as to be circulated.

Therefore, as shown in FIG. 1, at an inlet portion 26 of the superconducting cable 10 connected to the terminal structure 12 on the side provided with the refrigerator 16, the temperature of the cooling fluid is low, and the pressure thereof is high. On the other hand, at an outlet portion 28 of the super conducting cable 10 connected to the other terminal structure 14, the cooling fluid has a high temperature due to heat invasion and heat generated by the conductor as flowing along the line, and the pressure of the cooling fluid is reduced in proportion to distance.

Accordingly, the temperature increase and the pressure reduction of the cooling fluid are caused as the cooling fluid flows to the outlet portion 28 of the superconducting cable 10, so that the superconducting properties cannot be maintained. In order to solve this problem, the cooling fluid may be compensated for a reduction in the pressure of the cooling fluid supplied to the inlet portion 26 of the superconducting cable 10. However, in this case, mechanical damage occurs in the terminal structure 12 and a cryostat of the superconducting cable. Particularly, control of the pressure of the cooling fluid is performed by a circulation pump 18. Here, a capacitance of the circulation pump 18 is limited, so that there is a difficulty in maintaining the superconducting properties on the long distance line.

SUMMARY

This disclosure provides a stop joint for a superconducting cable capable of maintaining superconducting properties in applications of the superconducting cable by installing the stop joint on a long distance line to reduce a circulation distance of a cooling fluid.

In one aspect, there is provided a stop joint for a superconducting cable, which is installed on lines of superconducting cables connected to terminal structures, including: a vacuum chamber provided with lead-in holes on both sides; a nitrogen chamber structure which is accommodated inside the vacuum chamber and is connected to cooling fluid flow paths of the superconducting cables when the superconducting cables are led in; an electrode structure which is disposed inside the nitrogen chamber structure to be electrically connected to conductors of the superconducting cables led in from both sides of the nitrogen chamber structure; a flow path separation member which is bonded to the electrode structure and is connected to the nitrogen chamber structure to block communication between first and second flow paths; and recovery holes which are provided in the nitrogen chamber structure on both sides of the flow path separation member to communicate with the first and second flow paths, and are connected to recovery pipes.

The nitrogen chamber structure includes on both sides first and second nitrogen chambers which are respectively provided with lead-in holes and flanges, the flanges of the first and second nitrogen chambers are disposed to face each other, and the recovery holes are provided in the first and second nitrogen chambers respectively having the first and second flow paths.

The electrode structure includes: a flow path separation portion-buried electrode; and an insulator bonded to the flow path separation portion-buried electrode.

The flow path separation member is bonded to the insulator, and an outer end portion of the flow path separation member is interposed between the flanges of the first and second nitrogen chambers and is fixed to the flanges.

A reinforcement insulator which encloses exposed portions of the conductors and exposed portions of the flow path separation portion-buried electrode pulled out from the insulator when the conductors of the superconducting cable are connected to the flow path separation portion-buried electrode, is further included.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
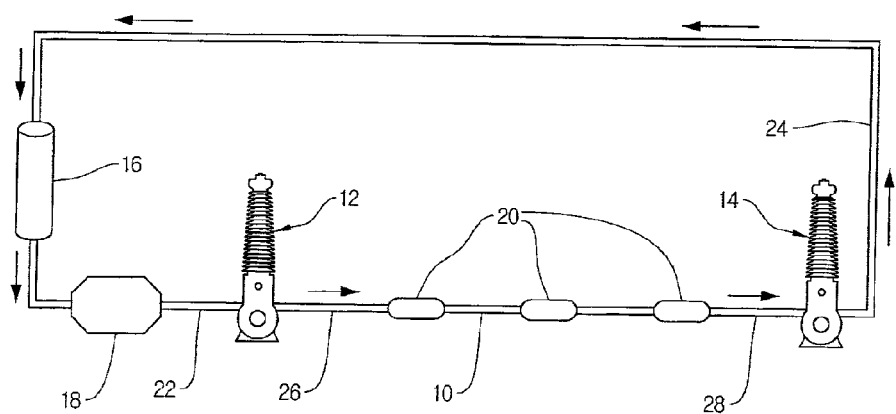
FIG. 1 is an explanatory view showing a superconducting cable system according to a related art.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 2:
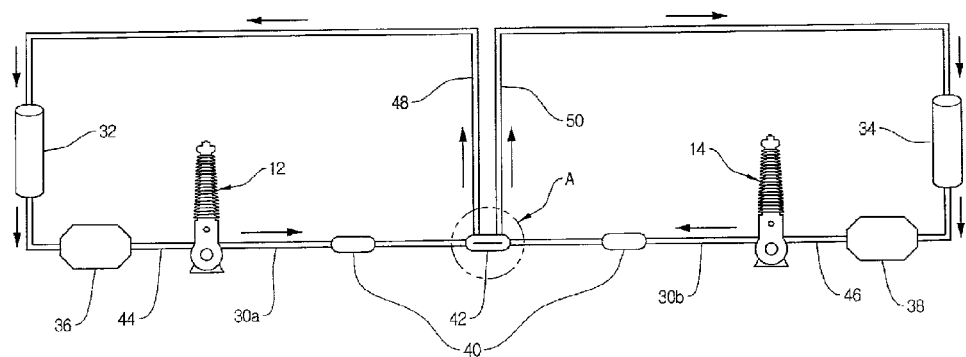
FIG. 2 is an explanatory view showing a superconducting cable system according to an embodiment.

FIG. 2 is an explanatory view showing a superconducting cable system according to an embodiment. As shown in FIG. 2, the superconducting cable system includes two terminal structures 12 and 14 to which superconducting cables 30a and 30b are respectively connected, and refrigerators 32 and 34 and circulation pumps 36 and 38 respectively provided on the front side of the terminal structures 12 and 14.

In order to extend the lengths of the superconducting cables 30a and 30b, a plurality of intermediate pull boxes 40 and a stop joint 42 are connected to a line.

In the superconducting cable system according to this embodiment, cooling fluid flow paths C1 and C2 are formed inside the superconducting cables 30a and 30b to cause a cooling fluid (for example, liquid nitrogen) to flow.

The cooling fluid is supplied to both the terminal structures 12 and 14 through respective supply pipes 44 and 46, and the cooling fluid flowing along the line is discharged through the stop joint 42 to recovery pipes 48 and 50 to be recovered by the refrigerators 32 and 34.

Figure 3:
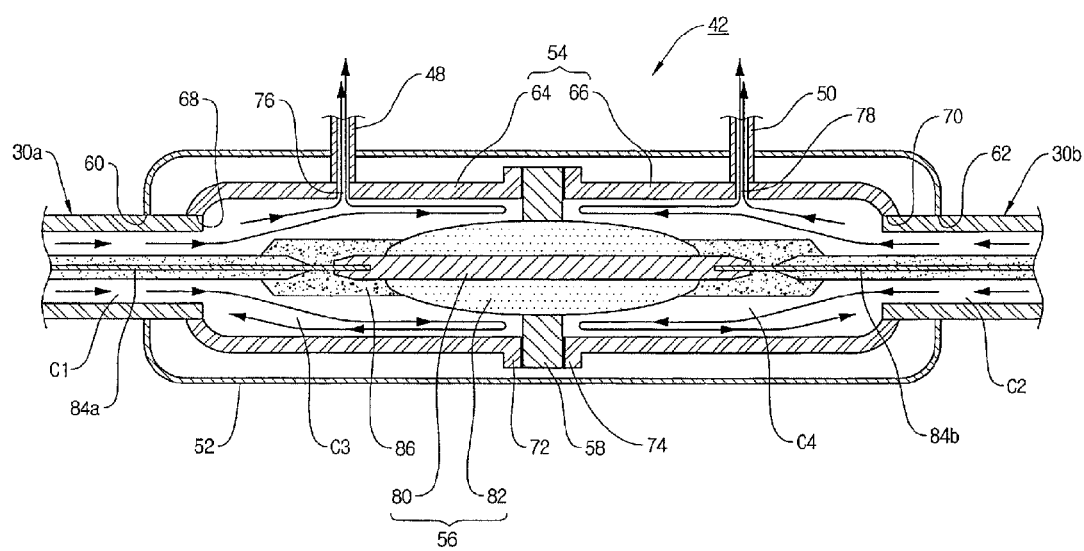
FIG. 3 is an enlarged cross-sectional view of a part A in FIG. 2.

FIG. 3 is an enlarged cross-sectional view of a part A in FIG. 2. As shown in FIG. 3, the stop joint 42 includes a vacuum chamber 52, a nitrogen chamber structure 54 accommodated inside the vacuum chamber 52, an electrode structure 56 which is disposed inside the nitrogen chamber structure 54 in the longitudinal direction so as to be electrically connected to conductors 84a and 84b of the superconducting cables 30a and 30b led in from both sides of the nitrogen chamber structure 54, a flow path separation member 58 which is provided to surround the electrode structure 56 and is connected to the nitrogen chamber structure 54 to block first and second flow paths C3 and C4, and recovery pipes 48 and 50 connected to the nitrogen chamber structure 54.

Specifically, the vacuum chamber 52 is provided with lead-in holes 60 and 62 on both the sides so as to lead in the superconducting cables 30a and 30b connected to the terminal structures 12 and 14.

The nitrogen chamber structure 54 is divided into a first nitrogen chamber 64 and a second nitrogen chamber 66. In addition, lead-in holes 68 and 70 respectively corresponding to the lead-in holes 60 and 62 of the vacuum chamber 52 are respectively formed on one sides of the first and second nitrogen chambers 64 and 66, and flanges 72 and 74 are respectively formed on the other sides thereof. The flanges 72 and 74 of the first and second nitrogen chambers 64 and 66 are disposed to face each other.

In addition, the first and second nitrogen chambers 64 and 66 are respectively provided with recovery holes 76 and 78. The recovery holes 76 and 78 are respectively connected to the recovery pipes 48 and 50, and the recovery pipes 48 and 50 are respectively connected to the refrigerators 32 and 34 provided on the front side of the terminal structures 12 and 14 (see FIG. 2).

The electrode structure 56 includes a flow path separation portion-buried electrode 80, and an insulator 82 provided to surround the outer periphery of the flow path separation portion-buried electrode 80. When the conductors 84a and 84b of the superconducting cables 30a and 30b are connected to the flow path separation portion-buried electrode 80 (for example, using pressure bonding or soldering), in order to reinforce insulation of exposed portions of the conductors 84a and 84b and exposed portions of the flow path separation portion-buried electrode 80, a reinforcement insulator 86 for enclosing the outer peripheries of the exposed portions may be further included.

In addition, as described above, in the electrode structure 56, the flow path separation member 58 is included to surround the insulator 82. Outer end portions of the flow path separation member 58 are interposed between the flanges 72 and 74 of the first and second nitrogen chambers 64 and 66 to be attached and fixed thereto. Accordingly, the first and second flow paths C3 and C4 formed on both sides of the flow path separation member 58 are blocked each other.

Accordingly, in the superconducting cable system according to this embodiment, a series of circulation operations in which the cooling fluid flowing through the cooling fluid flow paths C1 and C2 of the superconducting cables 30a and 30b flows into the first and second flow paths C3 and C4 of the stop joint 42, and the cooling fluid existing in the first and second flow paths C3 and C4 are recovered by the refrigerators 32 and 34 through the respective recovery pipes 48 and 50 is repeated.

In the superconducting cable system as described above, when the stop joint 42 is used for connection, the circulation path of the cooling fluid is partitioned, so that the length of the circulation path can be reduced and the reduction in the pressure of the cooling fluid can be minimized. Therefore, a phenomenon in which the superconducting properties cannot be maintained at the outlet 28 of the superconducting cable 10 as the length of the line is increased according to the related art is prevented. Particularly, mechanical damage of the terminal structures and the cryostat of the superconducting cable, which is caused by increasing the pressure of the cooling fluid supplied to the inlet 26 of the superconducting cable, is prevented.

That is, degradation of the superconducting properties, a reduction in current-carrying capability, breakage, and the like caused when the superconductor cable is applied to the long distance line can be prevented by the use of the stop joint 42.

According to the present disclosure, the stop joint is installed on the long distance line to partition circulation of the cooling fluid, thereby maintaining superconducting properties of the superconducting cables applied to the long distance line.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A stop joint for a superconducting cable, which is installed on lines of superconducting cables connected to terminal structures, comprising:
   a vacuum chamber provided with lead-in holes on both sides;
   a nitrogen chamber structure which is accommodated inside the vacuum chamber and is connected to cooling fluid flow paths of the superconducting cables when the superconducting cables are led in;
   an electrode structure which is disposed inside the nitrogen chamber structure to be electrically connected to conductors of the superconducting cables led in from both sides of the nitrogen chamber structure;
   a flow path separation member which is bonded to the electrode structure the electrode structure and is connected to the nitrogen chamber structure to block communication between first and second flow paths; and
   recovery holes which are provided in the nitrogen chamber structure on both sides of the flow path separation member to communicate with the first and second flow paths, and are connected to recovery pipes.

2. The stop joint for a superconducting cable according to claim 1,
   wherein the nitrogen chamber structure includes on both sides first and second nitrogen chambers which are respectively provided with lead-in holes and flange portions,
   the flange portions of the first and second nitrogen chambers are disposed to face each other, and
   the recovery holes are provided in the first and second nitrogen chambers respectively having the first and second flow paths.

3. The stop joint for a superconducting cable according to claim 2, wherein the electrode structure includes:
   a flow path separation portion-buried electrode; and
   an insulator bonded to the flow path separation portion-buried electrode.

4. The stop joint for a superconducting cable according to claim 3,
   wherein the flow path separation member is bonded to the insulator, and
   an outer end portion of the flow path separation member is interposed between the flange portions of the first and second nitrogen chambers and is fixed to the flange portions.

5. The stop joint for a superconducting cable according to claim 3, further comprising a reinforcement insulator which encloses exposed portions of the conductors and exposed portions of the flow path separation portion-buried electrode pulled out from the insulator, when the conductors of the superconducting cable are connected to the flow path separation portion-buried electrode.

6. The stop joint for a superconducting cable according to claim 4, further comprising a reinforcement insulator which encloses exposed portions of the conductors and exposed portions of the flow path separation portion-buried electrode pulled out from the insulator, when the conductors of the superconducting cable are connected to the flow path separation portion-buried electrode.

* * * * *